(12) United States Patent  
Miller (10) Patent No.: US 9,203,226 B2  
(45) Date of Patent: Dec. 1, 2015

(54) LAYING AND PROTECTING CABLE INTO EXISTING COVERING SURFACES

(71) Applicant: CertusView Technologies, LLC, Palm Beach Gardens, FL (US)

(72) Inventor: Daniel Paul Miller, Brush Prairie, WA (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 13/796,391

(22) Filed: Mar. 12, 2013

(65) Prior Publication Data

US 2013/0287500 A1    Oct. 31, 2013

Related U.S. Application Data

(63) Continuation of application No. 12/889,196, filed on Sep. 23, 2010, now Pat. No. 8,480,332.

(60) Provisional application No. 61/244,954, filed on Sep. 23, 2009.

(51) Int. Cl.

| | | |
|---|---|---|
| *F16L 1/00* | (2006.01) | |
| *H02G 9/00* | (2006.01) | |
| *E02F 3/88* | (2006.01) | |

(Continued)

(52) U.S. Cl.
CPC ............... *H02G 9/00* (2013.01); *E02F 3/8816* (2013.01); *E02F 5/02* (2013.01); *E02F 5/08* (2013.01); *E02F 5/101* (2013.01); *E02F 5/12* (2013.01); *H02G 1/06* (2013.01)

(58) Field of Classification Search
USPC ......... 405/154.1, 155, 179, 180; 37/352, 355, 37/142.5; 404/90, 91, 94; 125/13.01, 125/13.02, 13.03, 14, 15; 299/39.2, 39.3
See application file for complete search history.

(56) References Cited

U.S. PATENT DOCUMENTS 2,754,101 A    7/1956  Nutt et al.
3,585,980 A    6/1971  Mellor
(Continued)

FOREIGN PATENT DOCUMENTS

EP    0869223    10/1998
EP    2246485    11/2010
(Continued)

OTHER PUBLICATIONS http://www.yourdictionary.com/alongside.*
(Continued)

*Primary Examiner* — Sean Andrish (57) ABSTRACT

Methods and apparatus for cutting a trench (e.g., for a fiber optic cable or wire conductors) in an existing covering surface (e.g., a road surface), wherein the trench has a depth of approximately 10 to 12 inches and a width of approximately 0.5 to 1.25 inches. Debris from the cut trench is evacuated (e.g., vacuumed) from the trench as the trench is cut. The trench may be backfilled by flowing a non-shrinking composition into at least a portion of the trench and, after hardening of the non-shrinking composition, applying a topping material to a remaining portion of the trench. In one example, the non-shrinking composition is configured to rigidify within one hour of being flowed into the trench, be substantially impermeable thereafter (e.g., having a hydraulic permeability of less than 0.0000001 cm/s upon drying), and be non-compressible and non-expanding.

34 Claims, 6 Drawing Sheets

(51) Int. Cl.
*E02F 5/08* (2006.01)
*E02F 5/10* (2006.01)
*E02F 5/12* (2006.01)
*H02G 1/06* (2006.01)
*E02F 5/02* (2006.01)

(56) References Cited

U.S. PATENT DOCUMENTS

| | | |
|---|---|---|
| 4,326,347 A | 4/1982 | Ballinger |
| 4,329,083 A | 5/1982 | Parkinson |
| 4,542,940 A | 9/1985 | Marten |
| 4,554,724 A | 11/1985 | Bantz |
| 4,812,078 A | 3/1989 | Rivard |
| 4,900,094 A * | 2/1990 | Sergeant ............ 299/39.6 |
| 4,958,457 A | 9/1990 | Doskocil |
| 5,156,753 A | 10/1992 | Speidel |
| 5,167,215 A * | 12/1992 | Harding, Jr. ............ 125/13.01 |
| 5,203,101 A | 4/1993 | Bryan |
| 5,381,616 A | 1/1995 | Disney |
| 5,490,339 A | 2/1996 | Accettola |
| 5,879,109 A | 3/1999 | Finzel et al. |
| 6,099,080 A * | 8/2000 | Hirashita et al. ............ 299/39.3 |
| 6,371,691 B1 | 4/2002 | Finzel et al. |
| 6,457,267 B1 | 10/2002 | Porter et al. |
| 6,503,025 B1 | 1/2003 | Miller |
| 6,637,978 B1 | 10/2003 | Genta |
| 6,807,355 B2 | 10/2004 | Dofher |
| 6,830,412 B2 | 12/2004 | Pérez |
| 7,050,683 B2 | 5/2006 | Dofher |
| 7,225,803 B2 * | 6/2007 | Boyadjieff ............ 125/13.01 |
| 7,832,321 B1 * | 11/2010 | Zuzelo ............ 83/855 |
| D640,290 S | 6/2011 | Stellman et al. |
| 8,061,344 B2 | 11/2011 | Dofher |
| 8,480,332 B2 * | 7/2013 | Miller ............ 405/154.1 |
| 8,532,341 B2 | 9/2013 | Nielsen et al. |
| 8,612,276 B1 | 12/2013 | Nielsen et al. |
| 2002/0061231 A1 | 5/2002 | Finzel |
| 2003/0123935 A1 * | 7/2003 | Dofher ............ 405/183.5 |
| 2004/0148823 A1 | 8/2004 | Schenk |
| 2005/0031287 A1 | 2/2005 | Dofher |
| 2005/0191113 A1 | 9/2005 | Frazier |
| 2005/0191133 A1 | 9/2005 | Purcell |
| 2007/0096539 A1 * | 5/2007 | Walker et al. ............ 299/39.3 |
| 2008/0298755 A1 * | 12/2008 | Caplan et al. ............ 385/109 |
| 2009/0007460 A1 | 1/2009 | Greenlee |
| 2010/0071596 A1 | 3/2010 | Konczak |
| 2011/0016754 A1 * | 1/2011 | Ruhl et al. ............ 37/94 |
| 2012/0048148 A1 | 3/2012 | Konczak |
| 2012/0195694 A1 | 8/2012 | Konczak |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0162431 A1 | 6/2013 | Nielsen et al. |
| 2013/0174072 A9 | 7/2013 | Nielsen et al. |
| 2013/0182009 A1 | 7/2013 | Nielsen et al. |
| 2013/0186333 A1 | 7/2013 | Nielsen et al. |
| 2013/0231984 A1 | 9/2013 | Nielsen et al. |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |

FOREIGN PATENT DOCUMENTS

| | | |
|---|---|---|
| FR | 2773656 | 7/1999 |
| GB | 2213228 | 8/1989 |
| GB | 2468785 | 9/2010 |
| JP | 08081913 | 3/1996 |
| JP | 10280315 | 10/1998 |
| JP | 2001107314 | 4/2001 |
| KR | 200364313 | 10/2004 |
| KR | 1020040096985 | 11/2004 |
| KR | 1020060040419 | 5/2006 |
| KR | 100714162 | 5/2007 |
| KR | 2020080005301 | 11/2008 |
| WO | WO02065182 | 8/2002 |
| WO | WO2006048686 | 5/2006 |
| WO | WO2008048717 | 4/2008 |

OTHER PUBLICATIONS http://www.yourdictionary.com/alongside, date unknown.
http://www.thefreelibrary.com/Quanta's+new+microtrenching+system+speeds+fiber+deployment.-a0219013728, date unknown.
International Search Report and Written Opinion dated Jun. 20, 2011, Korean Intellectual Property Office, Republic of Korea, 8 pages.
U.S. Appl. No. 13/943,350, filed Jul. 16, 2013, Nielsen et al.
Notice of Allowance dated May 31, 2013 from U.S. Appl. No. 12/889,196.
Office Action dated Apr. 4, 2013 from U.S. Appl. No. 12/889,196.
Office Action dated Apr. 26, 2013 from U.S. Appl. No. 12/889,196.
Office Action dated May 14, 2013 from U.S. Appl. No. 12/889,196.
Examination Report dated Dec. 2, 2013 for GB Application No. 1210281.0.
Office Action dated Dec. 3, 2013 from Columbian Application No. 12-036.156.
Office Action dated Jun. 19, 2014 from Mexican Application No. MX/a/212/003509 (w/English translation).
Office Action dated Oct. 23, 2014 from Dominican Republic Application No. P2012-0079.
Examination Report dated Nov. 6, 2014 from GB Application No. GB1210281.
Combined Search and Examination Report dated Nov. 6, 2014 from GB Application No. GB1408577.3.
International Search Report and Written Opinion dated Oct. 15, 2014 from Application No. PCT/US14/23760.
"Improving Micro-Trenching: The Vision Becomes Reality," http://www.bbcmag.com/2009issues/sep09/BBP_Sep09_Quanta.pdf; Broadband Properties; Sep. 2009; 2 pages.
"The Evolution of Micro-Trenching in California," http://www.calditchwitch.com/custompage.asp?pg=Job+Stories; retrieved May 13, 2015; 1 page.
Office Action dated Jan. 20, 2015 from Mexican Patent Application No. MX/a/2012/003509 (w/English translation).

* cited by examiner

FIG. 6 ing and Protecting cable into Existing Covering Surfaces."
Ser. No. 12/889,196 claims the benefit, under 35 U.S.C. §119(e), of U.S. Provisional Ser. No. 61/244,954, filed Sep. 23, 2009, entitled "Laying and Protecting Cable into Existing Covering Surfaces."
Each of the above-identified applications is hereby incorporated herein by reference.

BACKGROUND

Problems are encountered when attempting to lay the "last mile" of underground cables such as, for example, a fiber optic cable or an electrical cable. The problem is accentuated in urban areas due to the dense build-out of the surrounding area, traffic congestions, and on-going road repairs occurring in urban areas.

Such cables may or may not be enclosed in a pipe or a conduit depending on customer needs. One or more cables may be enclosed in such a pipe or conduit depending on customer needs.

Prior systems used for the construction of underground paths for the insertion of underground cable were cumbersome. For example, operators had to make multiple passes to cut a slot prior to adequate insertion of the cable.

SUMMARY

An efficient system and method for laying the "last mile" of underground cables creating minimal disruption to property owners or less impact to the neighborhood is needed.

The following steps are carried out in the system and method. First, cut and immediately evacuate a void in the existing covering surface. Next, lay or apply cable(s) (cable, ducts and/or conduits) into the void (i.e. underground). Then, flow a non-shrinking composition into a portion of the void around the cable to fill a portion of the void. Upon rigidification the cable is encased in the void by the non-shrinking composition. Last, apply a topping material to the exposed surface of the composition in such volume as to fill any remaining portion of the void. This seals the void now filled with an underground cable line as encased by the composition.

DETAILED DESCRIPTION OF THE PREFERRED EMBODIMENT(S)

Figure 1:
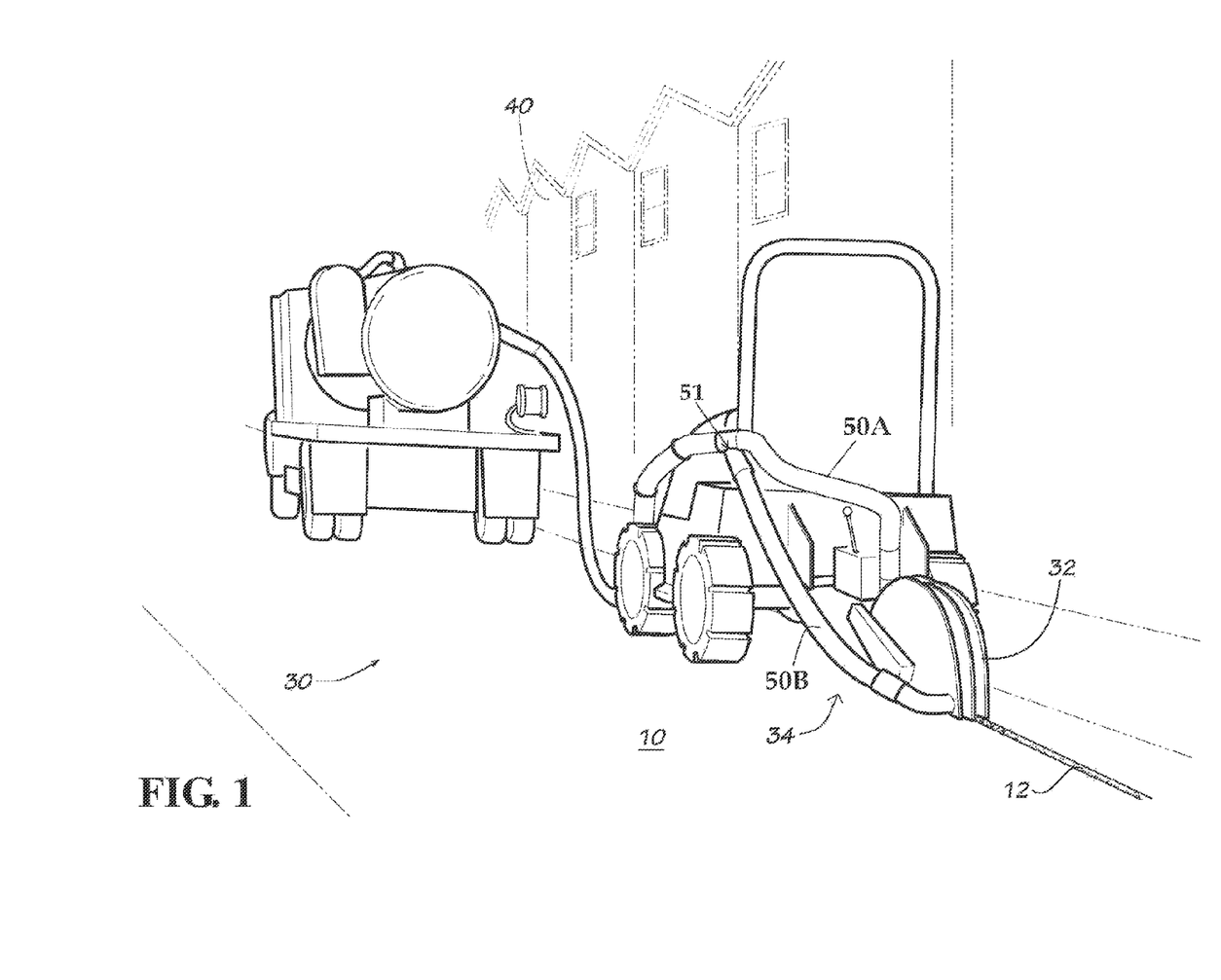
FIG. 1 is an elevation view of a cutting and evacuating machine making a channel through the covering surface in a neighborhood.
Figure 2:
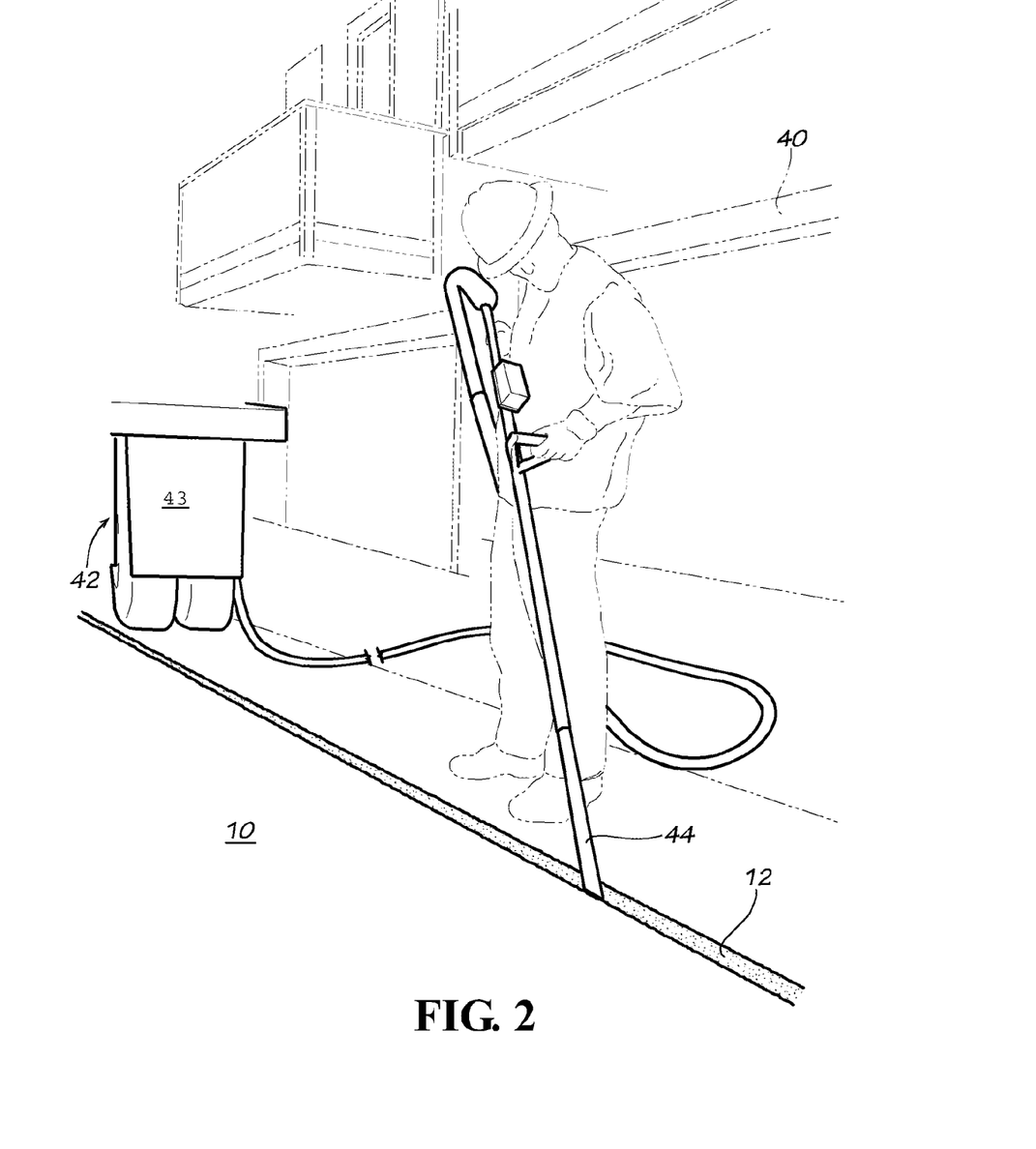
FIG. 2 is an elevation view of a grouting machine flowing grout into the channel of the covering surface within a neighborhood.
Figure 3:
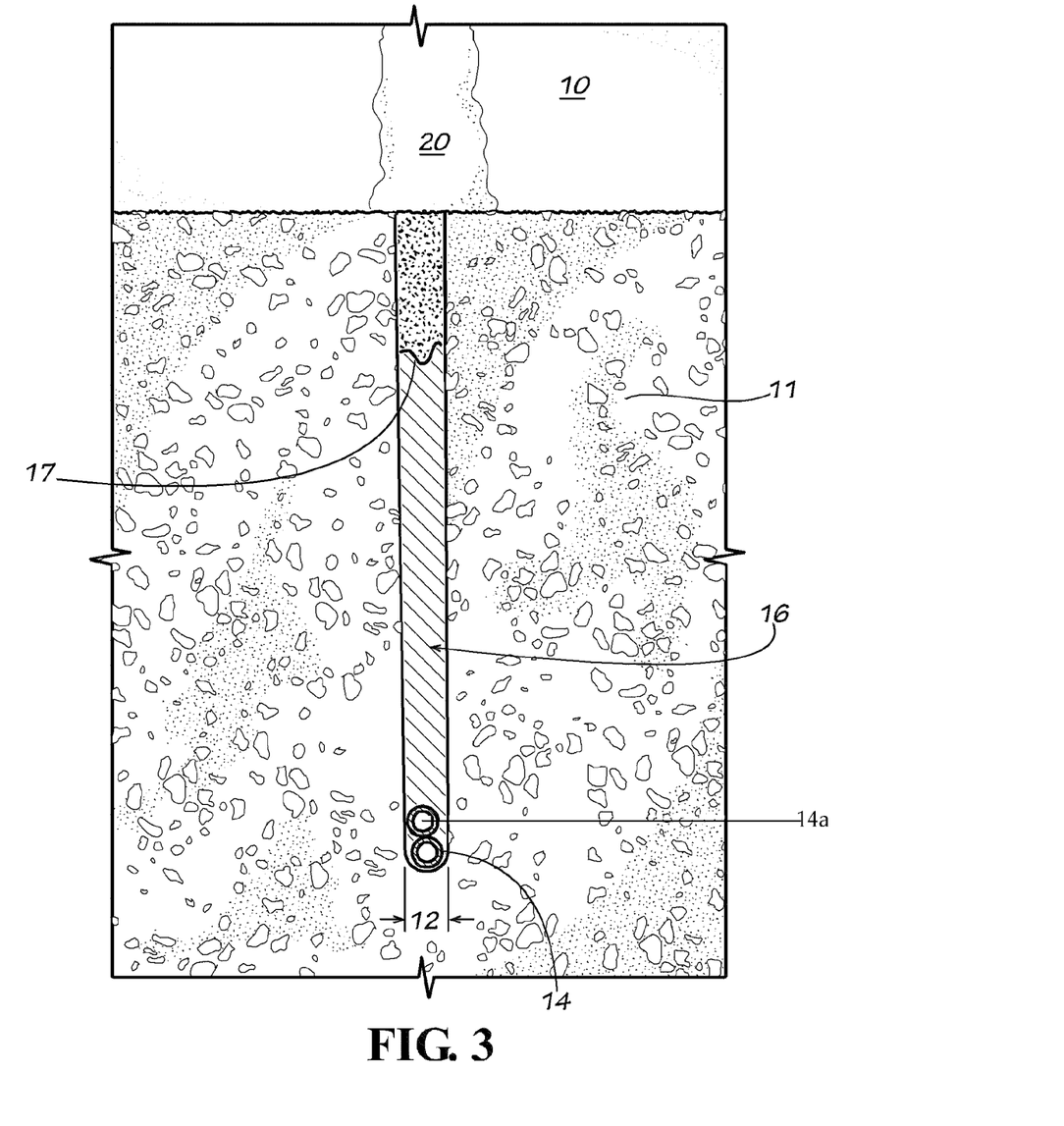
FIG. 3 is a sectional view of a channel through a covering surface filled with cables, grout and topping material.

Referring to FIG. 1, an underground cable line (FIG. 3) may be constructed or installed into an existing covering surface 10. The covering surface 10 is normally pre-existing and hence the challenge for construction of the underground cable line. Such existing covering surface 10 could be, but is not limited to, pavement, paving, concrete, asphalt, blacktop, cobblestone, brick, other road base, grade or surface, or the like, or any combination of the foregoing (e.g. combination of asphalt laid over concrete).

Figure 4:
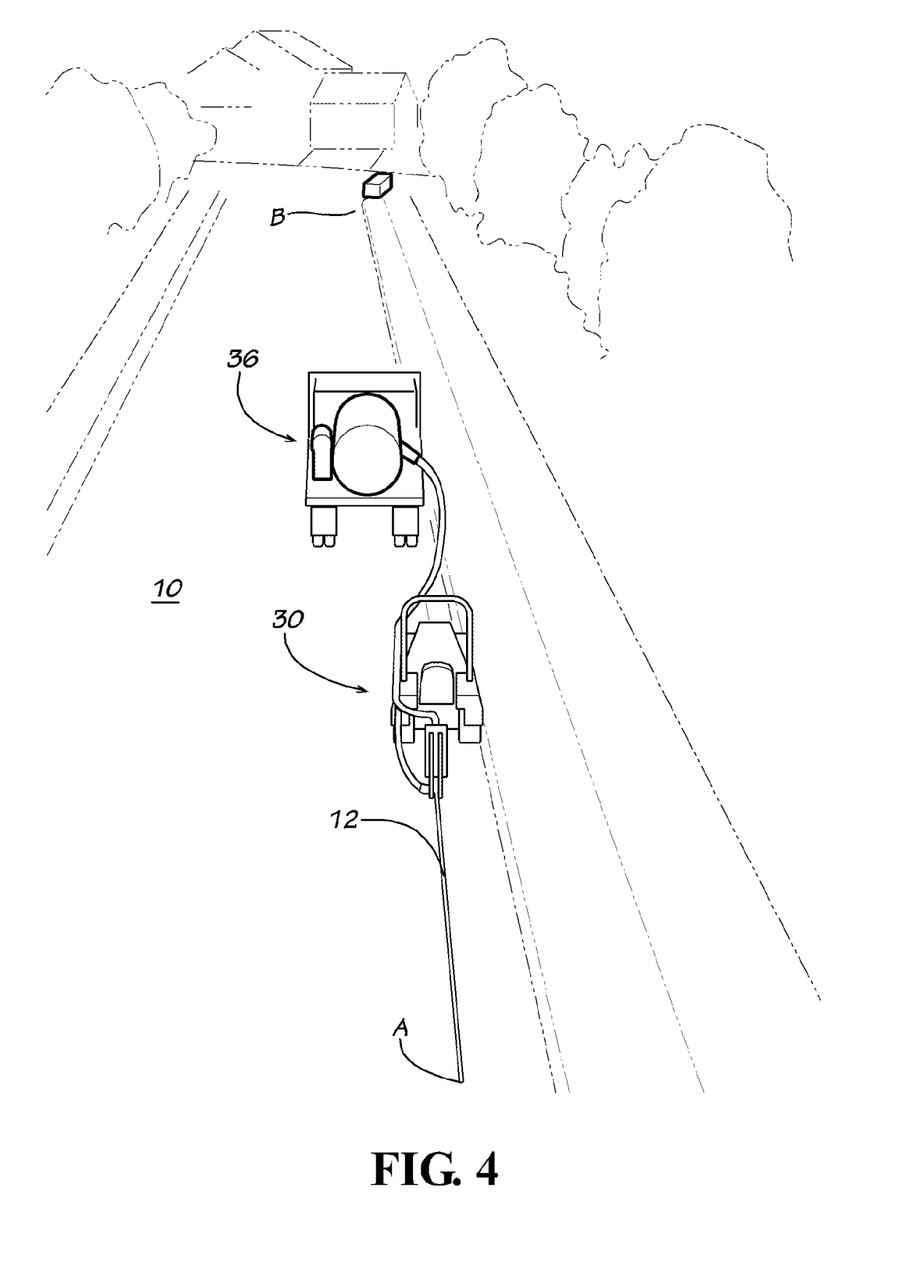
FIG. 4 is a perspective view of one embodiment cutting and evacuating a void in an existing covering surface within a neighborhood.

To construct the underground cable line, operator(s) cut and evacuate a void, channel or passage 12 into the existing covering surface 10 (having sub-surface 11). It is advantageous to avoid making multiple passes (as done in prior systems) in order to cut the void 12. Therefore the void 12 is cut in one and only one pass or swath from, referring to FIG. 4, a first position or starting point A to a second position or finishing point B (which may, for example, be separated by some kilometers or in another example by 45.72 meters (150 feet), i.e., cut in one and only one pass by a distance more than a few centimeters). Some of the advantages to using this technique include that the base is not disturbed as with multiple passes; less time is consumed in construction the void; the void is constructed with a simple uniform cut. Therefore the technique of cutting the void 12 in one and only one pass is quite advantageous.

Figure 5:
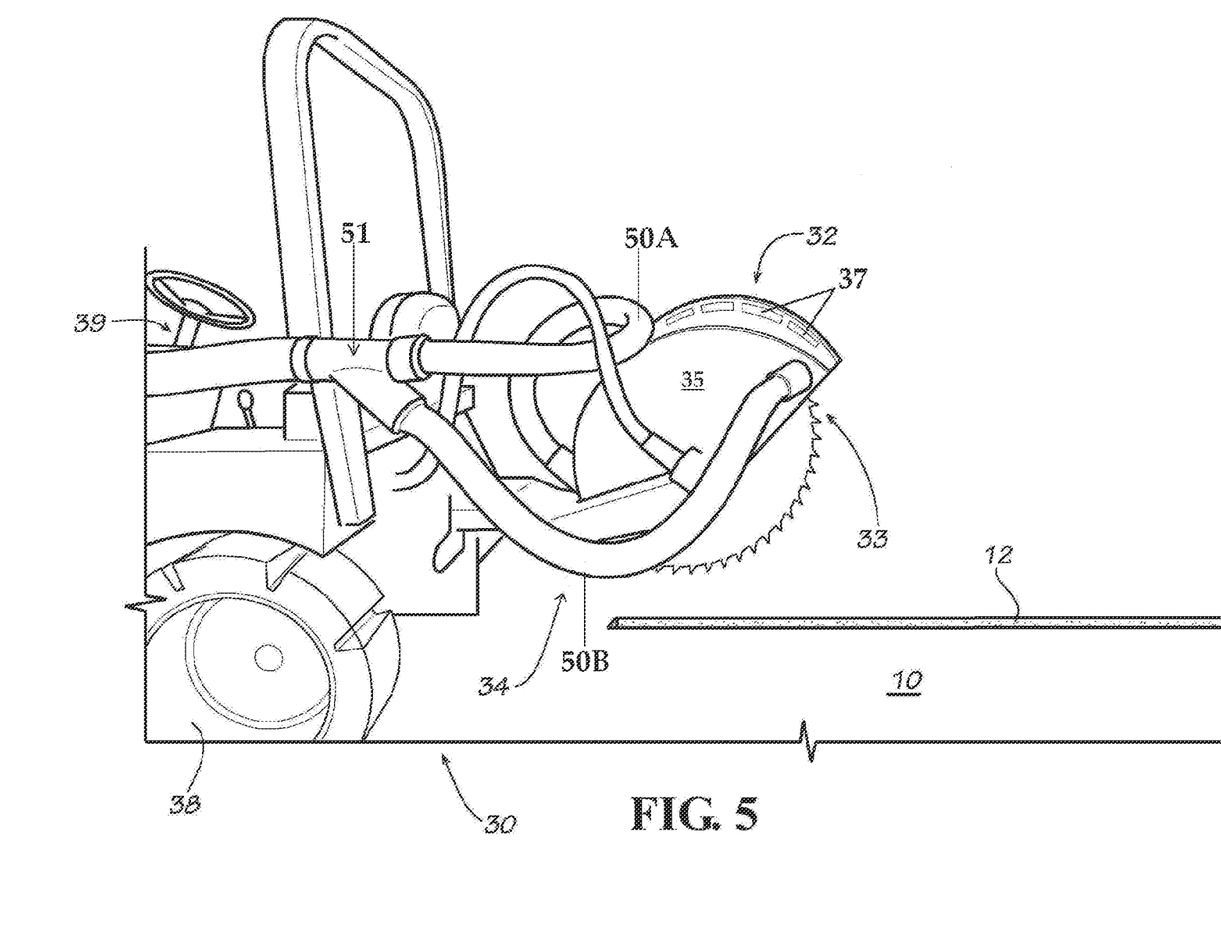
FIG. 5 is an elevation view of an embodiment of a portable cutting and evacuating machine with the blade of the cutter raised for inspection or transport.

One embodiment of a machine 30 which may be used to cut and evacuate in one and only one swath includes, for example, a cutter 32 with a narrow rotating blade 33 (FIG. 5) that will cut the existing covering surface 10 leaving a void 12 behind. The machine 30 is portable via, for example, wheels 38 (FIG. 5), and has an operator control station 39. Operator control station 39 (FIG. 5) includes a seat for the operator and a steering wheel to turn the machine 30. Each of the wheels 38 has an inner sidewall, an outer sidewall, and a circumferential area that contacts the covering surface 10. The circumferential area of each of the wheels 38 may include a grooved portion with a groove extending from the outer sidewall to the inner sidewall and may also include a portion free of grooves that is substantially free of tread. Outer sidewall and inner sidewall of wheels 38 may be substantially planar.

Accompanying the cutter 32, the machine 30 also immediately cleans or evacuates the void 12 such as by blowing, vacuuming, and/or sweeping the void 12. In the embodiment shown, a vacuum system 34 (e.g., including two evacuation ducts 50A and 50B and a Y-duct 51) accompanies the cutter 32 and is partially mounted to the machine 30. Preferably, but not limited to, the vacuum system 34 is in juxtaposition with respect to the cutter 32 and is mounted upper-lower, respectively and in relation to the cutter 32 such that the step of vacuuming occurs concurrent with the step of cutting the void 12. The vacuum system 34 may be connected to an independent portable vacuuming system 36 (FIG. 4) mounted to a vehicle and connected via a Y-duct 51.

Figure 6:
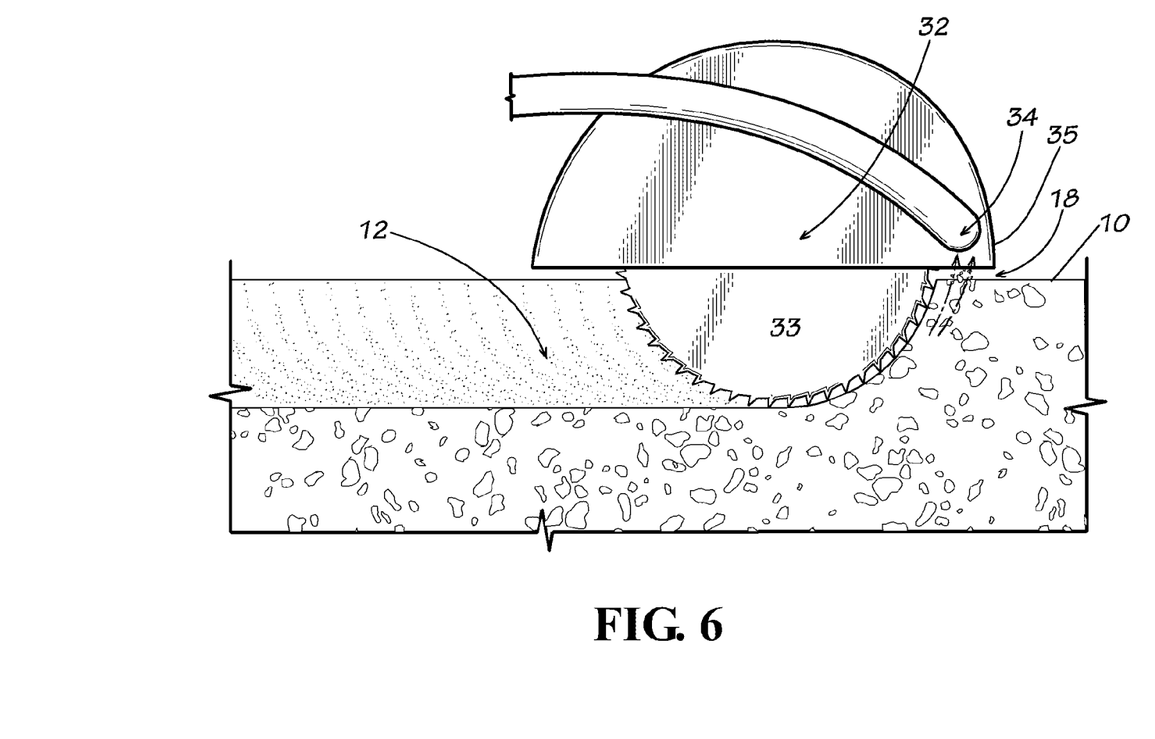
FIG. 6 is a schematic view in section of an embodiment of a cutter and vacuum system cutting and evacuating a void which is being cut into an existing covering surface.

In cutting the void 12 the action of the cutter 32 cuts and moves material and/or soil from the covering surface 10. this creates a stream or volume of debris (designated by arrows 18, FIG. 6) that generally has momentum from and travels in the direction of the cutter 32 (at least initially). The vacuum system 34 in juxtaposition to the cutter 32 concurrently, immediately and directly suctions the stream of debris 18 (preferably all or at least substantially all of the debris 18) through an inlet shroud 35 that includes one or more vents 37 and which overlaps the path of the stream of debris 18. This prevents the stream of debris 18 (containing cuttings, remnants, and/or excavated matter from the covering surface 10) from diffusing, circling with, and or recycling with the cutter 32 back into the void 12 and from creating dust in general. In the embodiment shown, the cutter 32 actually assists in moving the stream of debris around and into the cubic feet per second airflow suction of the vacuum system 34.

The blade 33 of the cutter 32 must have a width and diameter sufficient to cut a void 12 having a width and depth as follows. The width of the void 12 should be narrow, i.e., as narrow as possible to fit cable(s) or duct(s) 14 within the void 12. This allows vehicles to traverse the void 12 while the underground cable line is being constructed at the installation site. One example of an acceptable width is 1.75 cm ($^{11}/_{16}$ths of an inch). For purposes of limiting the changing of the cutter 32 blade 33 it may be useful to offer standard width voids/channels 12, and normally the width of the void 12 will be selected from either a range of 1.9 cm to 2.54 cm (0.75 in.-1 in. wide), or a 3.175 cm (1.25 in.) wide void. However, the width of the void 12 is not limited to these certain standard ranges. The width of the void 12 should be less than about 3.8 cm (1.5 inches) in any case and preferably less than or equal to 3.175 cm (1.25 in.). It has been discovered that if the width of the void 12 is too large, the asphalt will not properly bridge making the disclosed technique ineffective. On the lower end, voids 12 having a width of 1.27 cm (0.5 in.) have been successfully implemented, but 1.27 cm (0.5 in.) is not necessarily limiting at the lower end.

The void 12 must be greater than 10.16 cm (four inches) deep into the covering surface 10. Presently the preferred depth of the void 12 is 30.48 cm (twelve inches) deep. This avoids the penetration of existing utility lines (and further thereby speeds the permitting process). Excessive depth of the channel may inhibit evacuation of the cuttings or penetrate to undesirable areas but otherwise the depth of void 12 is not limited.

As described above the evacuating step pertains to the removal from the void 12 of any cuttings, etc. in the stream of debris 18 resulting from the cutting of the existing surface 10. Vacuuming simultaneously or instantaneously with the cutting of the void 12 is critical or quite advantageous to the effectiveness of the technology. By suctioning while cutting less dust is created, the action of the moving volume of air cools the cutting blade 33, removes materials that could create greater friction on the spinning blade 33, and creates a void 12 free of loose debris/cuttings. Vacuuming is one example of a procedure to be used for evacuating.

One embodiment of a machine 30 which is acceptable for use for carrying out the steps of cutting and evacuating is commercially available from DITCHWITCH of Perry, Okla., USA.

The cable(s) (cable, ducts and/or conduits) 14 must be laid or applied into the void 12. This may be performed by hand or machine (e.g. by machine 30). The cable(s) 14 are preferably placed into the bottom of the void 12. More than one cable 14 may be placed in the void 12. By way of example, ten to twelve small cables 14 each of which run to individual residences 40 may be placed in the void 12 together with another main cable 14a. Each cable 14 may contain, for example, one-hundred and forty-four fibers.

A composition 16 is flowed into the void 12 and over the cable(s) 14. Generally, the composition must be a flowable composition 16 and non-shrinking upon drying. The composition 16 fills a bottom portion of the void 12 and bonds or encases the cable(s) 14. The composition 16 is preferably a plaster, grout, or mortar substance.

For flowing and encasing it is currently preferable to flow a composition 16 in the form of a grout into the void 12 and over the cable(s) 14. To apply, the operator will ensure the duct 44 is held down into the void 12. Next, the grout is pumped of poured into the void 12 using, for example, a traditional grouting machine 42 having a pump 43 so that it will flow through the duct 44 and into the void 12. Preferably the operator will not fill the void 12 with the composition 16 up to the top level of the "covering surface" 10.

In describing the composition 16, by referring to it as "flowing" or "flowable", this means the composition 16 is viscid (i.e. has a sticky and fluid consistency) yet having a viscosity that does not prevent it from flowing into the void 12 on top of, around and under (i.e. surrounding) the cable(s) 14. The composition 16 flows under the cable(s) 14 and the cable(s) 14 could even experience some rise as the composition 16 flows around that cable(s) 14 depending upon specific gravity of the cable(s) 14 relative to the composition 16. Due to the flowability, no air-bubbles or spaces are created in the filled portion of the void 12 below the top surface 17 of the composition 16.

In describing the composition 16, by referring to it as "non-shrinking", this means the composition 16 is non-compressible, non-expandable, with no contraction. By way of example, the composition 16 should shrink less than one percent upon drying at ambient temperatures. As the composition 16 dries, no air-bubbles or spaces are created in the filled portion of the void 12 below the top surface 17 of the composition 16. There is no requirement to tamp the composition 16.

The composition 16 undergoes rigidification or solidification upon drying or setting. Upon drying, the cable(s) 14 are encased within the composition 16 within the void 12.

The composition 16 should be fast drying. The composition 16 should begin to rigidify within the first hour allowing the topping material 20 to be applied within approximately three to twelve hours after the composition 16 has been pumped or poured into the void 12.

The dried, rigidified composition 16 is impermeable meaning its hydraulic permeability is less than 0.0000001 cm/s. It has been discovered that groundwater does not negatively affect the integrity of the composition once it is rigidified within the void 12.

The currently preferred composition 16 is a grout 16a sold under the name SUPERGROUT, but other sufficiently flowable, non-shrinking materials may be implemented into the respective embodiment(s) of the technology discussed herein. SUPERGROUT is commercially available via the owner of domain name "supergroutproducts.com" or from MTsupergrout.com of Saginaw, Mich. In preparation, the grout 16a should be fluid when mixed with water. Blend, for example, nineteen liters (five gallons) of potable water per seventy pound bag of SUPERGROUT. The grout 16a sets in four hours, and sets as a rigid body. Such grout 16a may be topped off with a topping material 20 within one hour of pumping or pouring.

The composition 16 and the remaining top portion of the void 12 should be filled with a topping material 20 (e.g. blacktop) to cover and seal the composition 16 and the void 12. The topping material 20 preferably adheres to the composition 16. Preferably the topping material 20 is aesthetically invisible to the untrained eye.

It may be preferable to add or blend aggregate into the topping material 20 prior to its application. One having ordinary skill in the art knows how to apply such a topping material 20 which may, for example, be blacktop, asphalt or bitumen heated to 177° centigrade (350° Fahrenheit), and then applied or flowed into the remainder portion of the void 12.

A currently preferred topping material 20 (blacktop or asphalt) is a mastic repair material commercially available from (with specifications as provided by) Deery American Corporation, such as that, for example, sold under the brand name DEERY LEVEL & GO repair mastic or the like. Then, aggregate may be mixed in prior to application.

An operator having ordinary skill in the art may desire to cut a bend or curve when cutting a void 12. The operator may for example achieve cornering with a 12.2 meter (forty ft.) bending radius, or may make two cuts intersecting at ninety degrees, for example, to form a corner.

The various embodiments disclosed may be used with dirt roads or a soil surface as the technology is not necessarily limited to use on asphalt or other hard road surfaces.

After construction is completed and in the event that future road repairs or the like are needed, the applicable surface may be worked, planed, milled and/or removed without damage to the integrity of the cable(s) 14 and normally without damage to the integrity of the rigidified composition 16.

What is claimed is:

1. An apparatus for creating a channel through an existing covering surface, the apparatus comprising:
    a portable cutting machine including a single blade to cut through the existing covering surface and into a subsurface below the existing covering surface to create the channel, the existing covering surface comprising a first material selected from a group consisting of pavement, paving, concrete, asphalt, blacktop, cobblestone and brick, and the subsurface comprising a second material different from the first material, the single blade being configured to create the channel having a depth greater than a depth of the existing covering surface and a width between 1.27 cm and 3.8 cm, wherein the single blade is configured to create the channel having the depth of approximately 30.48 cm;
    a vacuum system including an inlet shroud covering at least a portion of the single blade, coupled to the portable cutting machine, to evacuate from the channel a volume of debris created by the single blade, wherein the inlet shroud includes at least one vent to further facilitate suction of the volume of debris from the channel;
    a first vehicle coupled to the portable cutting machine, wherein a first portion of the vacuum system is disposed on the first vehicle; and
    a second vehicle, wherein a second portion of the vacuum system is disposed on the second vehicle.

2. The apparatus of claim 1, wherein the single blade is configured to create the channel having a width of approximately 3.175 cm.

3. The apparatus of claim 1, wherein the portable cutting machine is configured to create the channel in only a single swath for a distance of at least 45.72 meters.

4. The apparatus of claim 1, wherein the vacuum system further includes a Y-duct, and at least two evacuation ducts coupled to the Y-duct and the inlet shroud, so as to facilitate suction of the volume of debris from the channel into the at least two evacuation ducts.

5. The apparatus of claim 1, wherein the vacuum system is configured to be activated concurrently with an activation of the single blade for creating the channel.

6. The apparatus of claim 5, wherein the vacuum system evacuates substantially all the debris created by the single blade constructing the channel thereby leaving the channel and surrounding area free of the debris created by the single blade constructing the channel.

7. The apparatus of claim 5, wherein an edge of the inlet shroud covering at least a portion of the single blade is parallel to the existing covering surface during concurrently cutting and evacuating of the channel.

8. The apparatus of claim 7, wherein the edge of the inlet shroud covering at least a portion of the single blade is proximate to the existing covering surface during concurrently cutting and evacuating of the channel.

9. The apparatus of claim 1, wherein the existing covering surface is within a neighborhood.

10. The apparatus of claim 1 wherein the at least one vent to further facilitate suction of the volume of debris from the channel overlaps a path of a stream of the debris created by the single blade constructing the channel.

11. The apparatus of claim 1, wherein the single blade is configured to create the channel having a depth of between 10.16 cm and 30.48 cm.

12. The apparatus of claim 1, wherein the single blade is circular.

13. The apparatus of claim 1, wherein the single blade of the portable cutting machine is configured to be raised for inspection or transport.

14. The apparatus of claim 1, wherein the channel is an underground cable channel for laying an underground cable.

15. The apparatus of claim 14, wherein the underground cable is a fiber optic or electrical cable.

16. The apparatus of claim 14, wherein the single blade of the portable cutting machine is configured to cut the underground cable channel in only one pass.

17. The apparatus of claim 14, wherein the width of the underground cable channel allows vehicles to traverse the underground cable channel prior to laying the underground cable.

18. The apparatus of claim 1, wherein the vacuum system is removably coupled to the portable cutting machine via a hose.

19. The apparatus of claim 1, wherein the first vehicle comprises an operator control station including a steering wheel and a seat.

20. The apparatus of claim 1, wherein the first vehicle comprises a plurality of wheels, and wherein at least one wheel of the plurality of wheels includes:
    an outer sidewall;
    an inner sidewall; and
    a circumferential area disposed between the outer sidewall and the inner sidewall, wherein at least one portion of the circumferential area is free of a groove extending from the outer sidewall or the inner sidewall.

21. The apparatus of claim 20, wherein the outer sidewall and the inner sidewall are substantially planar.

22. The apparatus of claim 20, wherein the at least one portion of the circumferential area disposed between the outer sidewall and the inner sidewall is substantially free of a tread.

23. An apparatus for constructing an underground cable line in situ through an existing covering surface, the apparatus comprising:
    a portable cutting machine including a single blade to cut through the existing covering surface and into a subsurface below the existing covering surface to create a channel, the existing covering surface comprising a first material selected from a group consisting of pavement, paving, concrete, asphalt, blacktop, cobblestone and brick, and the subsurface comprising a second material different from the first material, the single blade being configured to create the channel having a depth greater than a depth of the existing covering surface and a width between 1.27 cm and 3.8 cm, wherein the single blade is configured to create the channel having the depth of approximately 30.48 cm;

a vacuuming system including an inlet shroud covering at least a portion of the single blade, coupled to the portable cutting machine, to evacuate from the channel a volume of debris created by the single blade, wherein the inlet shroud includes at least one vent to further facilitate suction of the volume of debris from the channel;

a cable laying machine configured to lay a cable into the channel;

a flowing machine configured to dispense a volume of a flowable composition into a portion of the channel;

a first vehicle coupled to the portable cutting machine, wherein a first portion of the vacuum system is disposed on the first vehicle; and a second vehicle, wherein a second portion of the vacuum system is disposed on the second vehicle.

24. The apparatus of claim 23, wherein the single blade is configured to create the channel having a width of approximately 3.175 cm.

25. The apparatus of claim 23, wherein the portable cutting machine is configured to create the channel in only a single swath for a distance of at least 45.72 meters.

26. The apparatus of claim 23, wherein the vacuum system further includes a Y-duct, and at least two evacuation ducts coupled to the Y-duct and the inlet shroud, so as to facilitate suction of the volume of debris from the channel into the at least two evacuation ducts.

27. The apparatus of claim 23, wherein the vacuum system is configured to be activated concurrently with an activation of the single blade for creating the channel.

28. The apparatus of claim 23, wherein the single blade is configured to create the channel having a depth of between 10.16 cm and 30.48 cm.

29. An apparatus for creating a channel through an existing covering surface, the apparatus comprising:

a portable cutting machine including a blade to cut through the existing covering surface and into a subsurface below the existing covering surface to create the channel, the existing covering surface comprising a first material selected from a group consisting of pavement, paving, concrete, asphalt, blacktop, cobblestone and brick, and the subsurface comprising a second material different from the first material, the blade being configured to create the channel having a channel depth of between 10.16 cm and 30.48 cm and a channel width between 1.27 cm and 3.8 cm;

a vacuum system including an inlet shroud covering at least a portion of the blade, coupled to the portable cutting machine, to evacuate from the channel a volume of debris created by the blade; and a first vehicle coupled to the portable cutting machine, wherein the first vehicle and the portable cutting machine create the channel in only a single swath for a distance of at least 45.72 meters.

30. The apparatus of claim 29, wherein the blade is a single blade.

31. The apparatus of claim 29, wherein the inlet shroud includes at least one vent to further facilitate suction of the volume of debris from the channel.

32. The apparatus of claim 29, further comprising a second vehicle, wherein:

a first portion of the vacuum system is disposed on the first vehicle; and a second portion of the vacuum system is disposed on the second vehicle.

33. The apparatus of claim 29, wherein the first vehicle comprises an operator control station including a steering wheel and a seat.

34. The apparatus of claim 33, wherein the first vehicle comprises a plurality of wheels, and wherein at least one wheel of the plurality of wheels includes:

an outer sidewall;

an inner sidewall; and a circumferential area disposed between the outer sidewall and the inner sidewall, wherein at least one portion of the circumferential area is free of a groove extending from the outer sidewall or the inner sidewall.

\* \* \* \* \*